UNITED STATES PATENT OFFICE
CERTIFICATE OF CORRECTION

Patent No. 3,591,416                 Dated July 6, 1971

Inventor(s) Carl E. Johnson

It is certified that error appears in the above-identified patent and that said Letters Patent are hereby corrected as shown below:

Column 3, line 52, cancel "of baked" (first occurrence);

Same column, line 56, change "50" to --5--.

Signed and sealed this 11th day of July 1972.

(SEAL)
Attest:

EDWARD M. FLETCHER, JR.        ROBERT GOTTSCHALK
Attesting Officer                 Commissioner of Patents

United States Patent Office 3,591,418
Patented July 6, 1971

---

3,591,418
ELECTROCHEMICAL CELL FOR THERMAL BATTERIES HAVING TRANSITION METAL FLUORIDE CATHODE WITH METAL AND AN ALKALI METAL FLUORIDE ELECTROLYTE
Raymond A. Sutula, Hyattsville, Md., assignor to the United States of America as represented by the Secretary of the Navy
Filed Feb. 5, 1969, Ser. No. 796,667
Int. Cl. H01m 13/00
U.S. Cl. 136—83                                6 Claims

ABSTRACT OF THE DISCLOSURE

An electrochemical cell for construction of a thermal battery formed of three layers of pressed pellets, the first one of which is composed of a transition metal fluoride material and a conductive metal such as silver powder, the second of which is an alkali metal fluoride electrolyte mixture and the third one of which is an electrochemically active metal such as magnesium.

---

BACKGROUND OF THE INVENTION

This invention relates to thermal battery cells and more particularly to electrochemical cells for thermal batteries.

Batteries have been known for many years. Recently, thermal batteries, i.e., batteries which employ solid melt electrolyte systems and are activated by heat, have found considerable application, especially in those areas where a reliable source of a large amount of electrical energy after extended storage of the battery is needed for only a relatively short time.

The thermal batteries presently in use employ electrochemical cells which include transition metal oxide cathode materials such as vanadium oxide, tungsten oxide or copper oxide, magnesium anodes and molten lithium chloride/potassium chloride as the electrolyte material. These batteries, however, have not been found to be entirely satisfactory since they tend to break down prematurely. There exists, therefore, a great need for thermal batteries which can supply large amounts of energy for longer durations than heretofore attained, particularly for use in the area of modern weaponry.

Basically, there are at least two reasons for these aforenoted deficiencies of the prior art thermal batteries. Firstly, the transition metal oxide cathode materials employed react during discharge to form insoluble oxide compound products, which coat and insulate the cathode electrode, thereby terminating the desired electrochemical processes and causing the battery to die prematurely. For example, when vanadium pentoxide ($V_2O_5$) is used as the cathode material, $V^{+5}$ ions undergo a reduction to the $V^{+4}$ ion state. These ions ($V^{+4}$) and $Li^{+1}$ ions, which exist in the molten electrolyte, react with any available oxygen ($O^{-2}$) ions to form insoluble oxides, such as $Li_2O$–$V_2O_4$, commonly known as vanadium bronzes. These insoluble oxides interfere with the desired electrochemical processes by coating the cathode and thereby causing the battery to stop functioning prematurely.

Secondly, the chloride ions ($Cl^-$) present in the molten lithium chloride/potassium chloride electrolyte used are not very stable and relatively easily oxidize to chlorine gas by many high energy cathode materials. This can be extremely detrimental to the efficient operation of the battery since for one, an excessive buildup of the gas in the sealed battery can cause the battery to explode. Moreover, the wasteful use of cathodic material to produce chemical compounds rather than electrical energy is obviously undesirable. The electrochemical cells, therefor, of the prior art thermal batteries have of necessity been composed of only those cathodic materials which will not oxidize chloride ion to any appreciable extent and thereby have not used many high-energy-density, high-oxidation-state cathodic materials which might otherwise contribute to more efficient thermal battery operation.

In U.S. application, S.N. 762,465, now U.S. Pat. No. 3,498,843, Hunt et al. disclose electrochemical cells for thermal batteries employing alkali metal fluoride mixtures as electrolyte materials, and high-energy-density transition metal fluoride compounds as cathode materials. These cells solved many of the problems of the prior art thermal batteries as hereinbefore discussed, since the use of the fluoride mixtures as electrolytes permitted the employment of many new non-oxygen containing high-oxidation-state cathode materials, which would spontaneously oxidize a molten chloride. Furthermore, these cells do not react during discharge to form any insoluble products which limit cell performance, as is the case with the prior art cells. However, only a few of the transition metal fluorides cathode materials in the fluoride anion based electrolyte system of Hunt et al. generate any significant amount of voltage under load conditions. Moreover, even some of the open circuit voltages produced by Hunt et al. are not as high as might be desirable.

SUMMARY OF THE INVENTION

Accordingly, it is an object of this invention to provide an improved electrochemical cell for use in thermal batteries which is characterized by all the desirable qualities of the Hunt et al. cells but which are further characterized by higher open circuit voltages, higher load voltages and increased performance efficiency.

Generally this and other objects are attained by an electrochemical cell employing a mixed alkali metal fluoride, a mixed alkaline earth metal fluoride or a mixed alkali metal-alkaline earth metal fluoride electrolyte material and a transition metal fluoride compound in combination with a conductive metal powder selected from the group consisting of silver, copper, platinum, and mixtures thereof, as the total cathode material with any of the commonly employed anode and current collector materials to complete the system.

BRIEF DESCRIPTION OF THE DRAWING

The sole figure is an expanded perspective view of an electrochemical cell according to the present invention.

DESCRIPTION OF THE PREFERRED EMBODIMENTS

The electrochemical cell according to this invention, as with the Hunt et al. cell, utilizes alkali metal fluoride mixtures as the electrolyte material, thereby permitting the employment of new high-oxidation-state cathode materials which spontaneously oxidize a molten chloride but do not oxidize the more stable molten fluoride. Any of the electrolyte materials disclosed by Hunt et al. may also be employed in the cells of the present invention. Some of these are, for example, LiF-NaF-KF eutectic (M.P. 458°), containing 42 mole percent KF, 46.5 mole percent LiF and remainder NaF, KF-NaF eutectic (M.P. 700° C.) containing 59.5 mole percent KF, remainder NaF, $CaF_2$-KF-LiF eutectic (M.P. 490° C.) containing 2.3 mole percent $CaF_2$, 48.6 mole percent KF and 49.1 mole percent LiF, and KF-LiF eutectic (M.P. 475° C.) containing 50 mole percent KF and 50 mole percent LiF. The preferred electrolyte material is the eutectic mixture of LiF-NaF-KF, commonly known as Flinak.

The cathode materials of the present invention may be any of the high-oxidation-state transition metal fluoride compounds as disclosed by Hunt et al., such as manganese trifluoride, $MnF_3$, vanadium trifluoride $VF_3$, vanadium 4. The battery according to claim 1 wherein the carrier of the positive electrode consists of sintered copper powder with a layer of gold free from pores.

References Cited

UNITED STATES PATENTS

| | | | |
|---|---|---|---|
| 3,235,473 | 2/1966 | LeDuc | 136—120FC |
| 3,262,815 | 7/1966 | Langer et al. | 136—28 |
| 3,335,033 | 8/1967 | Kober | 136—28 |
| 3,388,004 | 6/1968 | Rosenblatt | 136—120FC |
| 3,498,842 | 3/1970 | Rowlette | 136—28 |

WINSTON A. DOUGLAS, Primary Examiner

C. F. LEFEVOUR, Assistant Examiner

U.S. Cl. X.R.

136—28, 36, 56

3. The electrochemical cell of claim 1 wherein the transistion metal fluoride compound is $MnF_3$, the conductive metal powder is silver and wherein the electrolyte is LiF-NaF-KF eutectic.

4. An electrochemical cell comprising three layers of pressed pellets, a first one of said pellets being composed of a mixture of a transition metal fluoride compound and a conductive metal powder, wherein said transition metal fluoride compound is selected from the group consisting of $Na_3CuF_6$, $K_3CuF_6$, $K_2MnF_6$, $KAgF_4$, $K_3NiF_6$, $K_2VF_6$, $K_2CrF_6$, $K_3FeF_6$, $VF_4$, $VF_3$, $CrF_3$, $FeF_3$, $CoF_3$, $CuF_2$, $AgF_2$ and $MnF_3$, and said conductive metal powder being a metal different than the transition metal is selected from the group consisting of silver, copper, platinum and mixtures thereof, a second one being composed of an electrolyte selected from the group consisting of a mixture of alkali metal fluorides, alkaline earth metal fluorides and alkali metal-alkaline earth metal fluorides, the third pellet being composed of an electrochemically active metal and means for providing an output for said cell.

5. The electrochemical cell of claim 4 wherein said electrolyte is LiF-NaF-KF eutectic.

6. The electrochemical cell of claim 4 wherein the transition metal fluoride compound is $MnF_3$ and the conductive metal powder is silver.

References Cited

UNITED STATES PATENTS

| | | | |
|---|---|---|---|
| 2,928,890 | 3/1960 | Van der Grinten et al. | 136—83 |
| 3,318,734 | 5/1967 | McCully | 136—83 |
| 3,455,742 | 7/1969 | Rao | 136—153 |
| 3,498,843 | 3/1970 | Hunt et al. | 136—83 |

ALLEN B. CURTIS, Primary Examiner

C. F. LE FEVOUR, Assistant Examiner

U.S. Cl. X.R.

136—155